(12) United States Patent  
Chang

(10) Patent No.: US 10,318,307 B2  
(45) Date of Patent: Jun. 11, 2019

(54) SCALARIZATION OF VECTOR PROCESSING

(71) Applicant: MediaTek Inc., Hsinchu (TW)

(72) Inventor: Jia-Yang Chang, Hsinchu (TW)

(73) Assignee: MediaTek, Inc., Hsinchu (TW)

( * ) Notice: Subject to any disclaimer, the term of this patent is extended or adjusted under 35 U.S.C. 154(b) by 407 days.

(21) Appl. No.: 14/741,505

(22) Filed: Jun. 17, 2015

(65) Prior Publication Data

US 2016/0371093 A1 Dec. 22, 2016

(51) Int. Cl.
*G06F 9/30* (2018.01)
*G06F 9/38* (2018.01)
*G06F 15/78* (2006.01)

(52) U.S. Cl.
CPC ............ *G06F 9/3887* (2013.01); *G06F 15/78* (2013.01)

(58) Field of Classification Search
None
See application file for complete search history.

(56) References Cited

U.S. PATENT DOCUMENTS

| 2013/0042090 A1* | 2/2013 | Krashinsky | G06F 9/3016 |
| | | | 712/214 |
| 2014/0244968 A1 | 8/2014 | Greyzck et al. | |
| 2015/0121038 A1 | 4/2015 | Dasika et al. | |

FOREIGN PATENT DOCUMENTS

| CN | 102508820 A | 6/2012 |
| CN | 102640131 A | 8/2012 |
| CN | 102640132 A | 8/2012 |
| CN | 103809964 A | 5/2014 |
| CN | 104699465 A | 6/2015 |

OTHER PUBLICATIONS

Lee et al, Convergence and Scalarization for Data-Parallel Architectures, CGO'13 Feb. 2013, Shenzhen, China.

* cited by examiner

*Primary Examiner* — Corey S Faherty
(74) *Attorney, Agent, or Firm* — Tong J. Lee

(57) ABSTRACT

A Single-Instruction-Multiple-Treads (SIMT) computing system includes multiple processors and a scheduler to schedule multiple threads to each of the processors. Each processor includes a scalar unit to provide a scalar lane for scalar execution and vector units to provide N parallel lanes for vector execution. During execution time, a processor detects that an instruction of N threads has been predicted by a compiler to have (N−M) inactive threads and the same source operands for M active threads, where N>M≥1. Upon the detection, the instruction is sent to the scalar unit for scalar execution.

20 Claims, 6 Drawing Sheets

SCALARIZATION OF VECTOR PROCESSING

TECHNICAL FIELD

Embodiments of the invention relate to vector processing; and more specifically, to vector processing in a single-instruction multiple-thread (SIMT) computing system.

BACKGROUND

Single instruction, multiple threads (SIMT) is a parallel execution model adopted by some modern graphics processing units (GPUs). Such a GPU can execute a single instruction on multiple threads concurrently in lock-step by utilizing its parallel data paths. Single-program multiple-data (SPMD) accelerator languages such as CUDA® and OpenCL® have been developed to enhance the computing performance of GPUs that have the SIMT architecture.

Some modern GPUs can execute a single instruction on more threads than the number of its parallel data paths. For example, a processor with 32 parallel data paths may execute one instruction on 128 threads in 4 sequential cycles. These 128 threads are hereinafter referred to as a thread block. All of the threads in a thread block share one program counter and instruction fetch, and are executed in lock-step, e.g., 32 threads in each of the 4 sequential cycles.

SIMT reduces program counters and instruction fetching overhead, but in some scenarios suffers from poor utilization of computing resources due to the lock-step execution model. For example, to handle an if-else block where various threads of a processor follow different control-flow paths, the threads that follow the "else" path are disabled (waiting) when the threads that follow the "if" path execute, and vice versa. That is, one control-flow path is executed at a time, even though the execution is useless for some of the threads. Furthermore, poor utilization also comes from redundant bookkeeping across the threads. For example, in a while-loop, all threads of a processor execute the loop count increment in lock-step even though the increment is uniform (i.e., the same) across all threads. In addition to redundant loop count calculations, often times threads calculate the same branch conditions, replicate the same base addresses, and perform similar address calculations to retrieve data from data arrays. Therefore, there is a need for reducing the redundancy in SIMT computing to improve system performance.

SUMMARY

In one embodiment, a method is provided for processing an instruction sequence of multiple threads for execution in an SIMT computing system. The method comprises the step of analyzing, during compile time, the instruction sequence for execution by a processor in the SIMT computing system. The processor includes a scalar unit providing a scalar lane for scalar execution and vector units providing N parallel lanes for vector execution of N threads. The method further comprises the steps of: predicting that an instruction in the analyzed instruction sequence has (N−M) inactive threads and same source operands for M active threads among the N threads, wherein N>M≥1; and generating code for the instruction to be executed by the scalar unit.

In another embodiment, a method is provided for executing an instruction sequence of N threads in an SIMT computing system. The method comprises the step of detecting, during execution time, that an instruction in the instruction sequence has (N−K) inactive threads and same source operands for K active threads among N threads in a processor of the SIMT computing system. The processor includes a scalar unit providing a scalar lane for scalar execution and vector units providing N parallel lanes for vector execution of the N threads, and 1≥K≥Threshold<N. The method further comprises the steps of dispatching the instruction for the scalar execution; and executing the instruction using the scalar unit.

In yet another embodiment, an SIMT computing system is provided. The SIMT computing system comprises a plurality of processors, each of the processors including a scalar unit to provide a scalar lane for scalar execution and vector units to provide N parallel lanes for vector execution; and a scheduler to schedule multiple threads to each of the processors. Each of the processors is adapted to: detect, during execution time, that an instruction of N threads has been predicted by a compiler to have (N−M) inactive threads and same source operands for M active threads among the N threads, wherein N>M≥1; and execute the instruction using the scalar unit.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
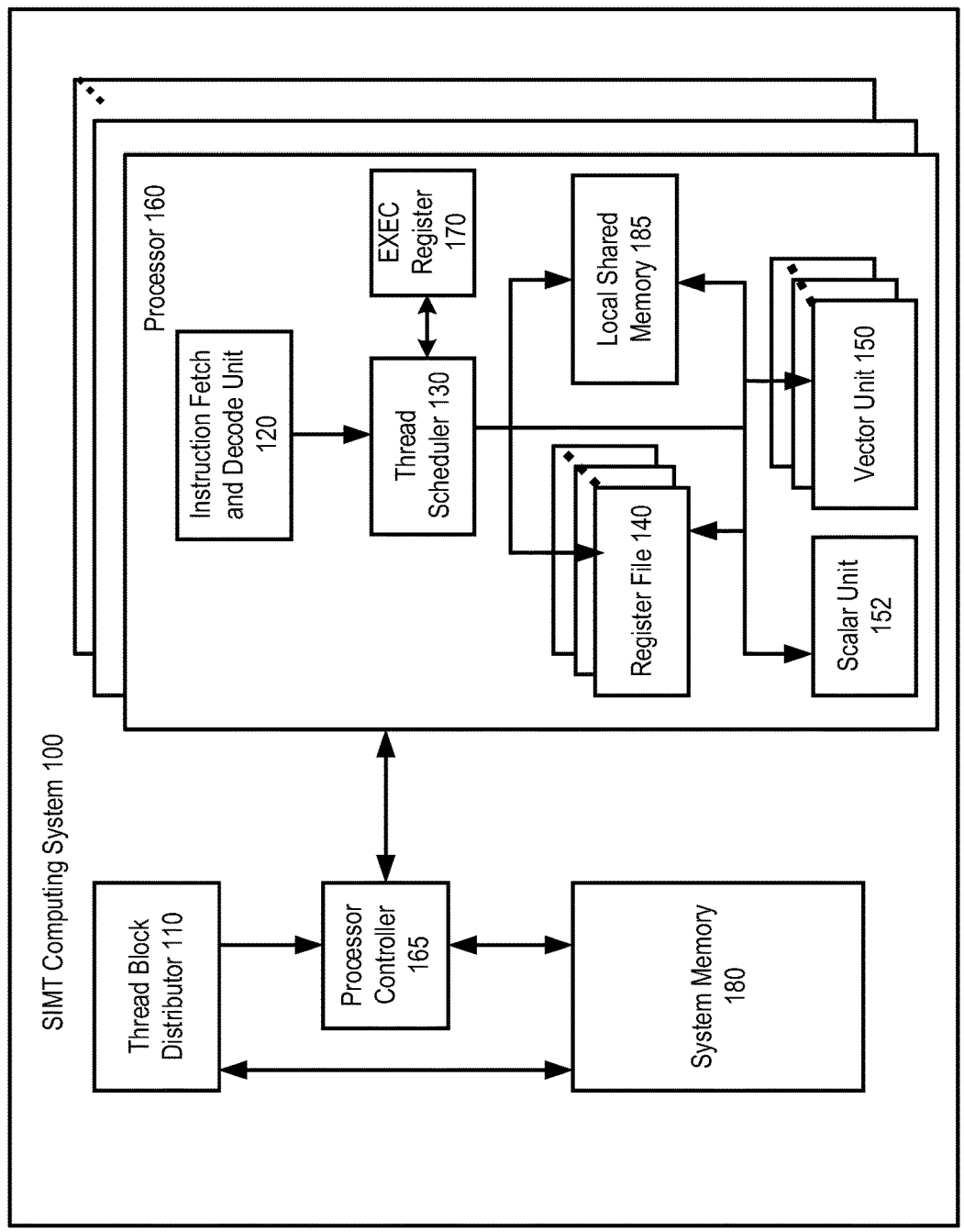
FIG. 1 illustrates an SIMT computing system according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

According to embodiments of the invention, a system and method is provided to improve the efficiency of an SIMT computing system by scalarizing vector processing of multiple threads. If a group of threads (i.e., a thread block) of an instruction have the same source operands (therefore the same result), the operation of these threads is dispatched to a scalar execution unit and the operation result is broadcast to the destinations of these threads. Furthermore, if one or more threads in a thread block are active for an instruction (e.g., enabled to produce results for that instruction) and the rest is inactive (e.g., disabled from producing results for that instruction), and the active threads have the same source operands, then the active threads' operation is dispatched to the scalar execution unit and the operation result is broadcast to the destinations of the active threads. Scalarization of the operations of multiple threads reduces redundant computations and register accesses, and therefore save power. By moving the operations of active threads to the scalar execution unit, the vector execution units become available for processing another vector instruction in parallel with the scalarized instruction. Thus, potentially two instructions can be issued in one cycle, and therefore thread-level parallelism is increased.

When an instruction with the same source operands is executed across all of the threads in a thread block, the instruction is called a "uniform" instruction. When an instruction with the same source operands is executed across all of the active threads in a thread block while some of the threads in the thread block are inactive, the instruction is called a "conditionally uniform" instruction. For simplicity of the description, a uniform instruction is deemed as a special case of a conditionally uniform instruction; i.e., conditionally uniform instructions include uniform instructions unless specifically indicated otherwise.

An example of a uniform instruction (in pseudo-code) is: mov R1, 0L, which moves a constant value zero to register R1 for all of the threads. If the move instruction is inside a conditional statement; e.g., an if-statement, such that it is executed for only some, but not all, of the threads, then the instruction is conditionally uniform (in this case, it is conditionally uniform but not uniform).

In the description hereinafter, the term "vector processing" refers to the parallel execution of multiple threads. Vector processing is performed by vector execution units (also referred to as "vector units") in a processor. When the number of threads in a thread block is the same as the number of vector units in a processor, each vector unit provides one "vector lane" (also referred to as a "parallel lane") for vector execution. When the number of threads in a thread block exceeds (e.g., is a multiple of) the number of vector units in a processor, each vector unit is time-multiplexed to provide multiple vector lanes. Although the threads executed by a time-multiplex vector unit are executed in multiple sequential cycles, for the purpose of this description all threads in a thread block are executed in parallel. In other words, different threads of a thread block are executed on different vector lanes in parallel.

In addition, the SIMT computing system described herein includes a scalar lane for scalar execution. Scalar execution is performed by a scalar execution unit (also referred to as a scalar unit). Scalar execution can be performed concurrently with vector execution. Scalarization of a vector processing instruction means that the scalar unit, instead of the vector units, executes an instruction for multiple threads that have the same source operands. Scalarization of a conditionally uniform instruction removes the redundant computation when there are multiple active threads. Furthermore, as a conditionally uniform instruction may use only one or a small number of lanes, moving it to the scalar lane and issuing another vector processing instruction to the vector lane improves utilization of the computing resources.

FIG. 1 is a block diagram of a SIMT computing system 100 that scalarizes conditionally uniform instructions according to one embodiment. An example of the SIMT computing system 100 is a graphic processing unit (GPU), a multimedia processing system, a signal processing system, or any high-performance computing system.

In the embodiment of FIG. 1, the SIMT computing system 100 includes a plurality of processors 160, and each processor 160 includes a scalar unit 152 and a plurality of vector units 150. Processing tasks enters the SIMT computing system 100 in the form of threads organized as thread blocks. Each processor 160 may process multiple thread blocks concurrently. Each thread block contains a group of threads that share the same instruction. Each thread has its own register file 140, and shares data with other threads in the thread block via a local shared memory 185.

The SIMT computing system 100 also includes a thread block distributor 110, which schedules and distributes thread blocks to the processors 160 via a processor controller 165. When a thread block is scheduled to a processor 160, the processor's instruction fetch and decode unit 120 fetches and decodes an instruction, and a thread scheduler 130 schedules the instruction and the threads in the thread block for execution in appropriate cycles; e.g., when the source operands of the instruction for these threads become available. The source operands may include a constant, or may be fetched from the register files 140 or memory, such as system memory 180, the local shared memory 185, cache memory or other memory locations. Then the instruction along with the source operands are sent to the vector units 150 or the scalar unit 152 for execution.

Figure 2:
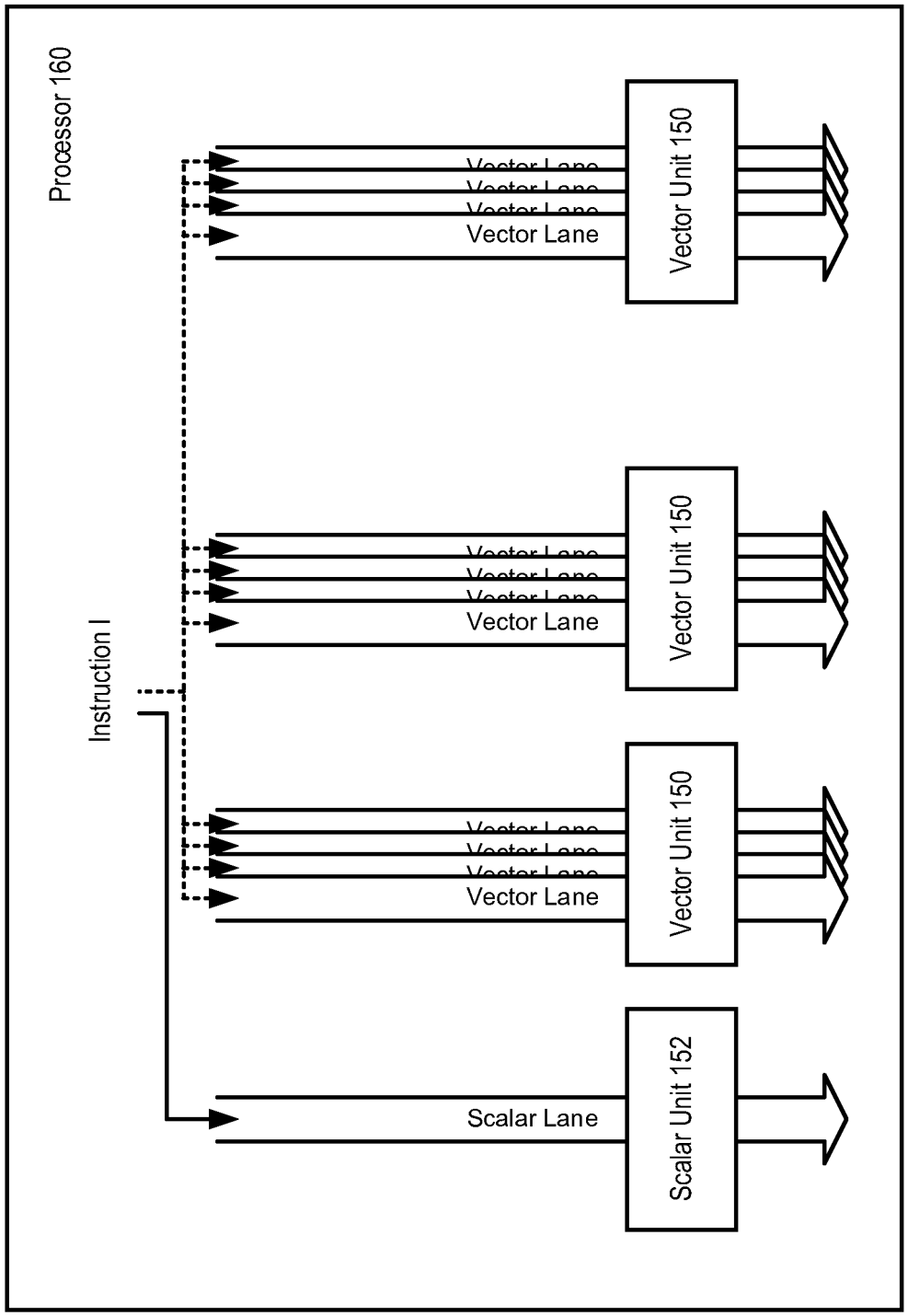
FIG. 2 illustrates multiple vector lanes and a scalar lane according to one embodiment.

In one embodiment, the vector units 150 provide N vector lanes for vector execution. Additionally, each processor 160 also includes a scalar unit 152 to provide one scalar lane for scalar operations. The vector units may be time-multiplexed if the number of vector units is less than N. For example, 64 vector units may provide 128 vector lanes when each vector unit is time-multiplexed 4 times. In some embodiments, the scalar unit 152 may also be time-multiplexed to provide multiple scalar lanes. For simplicity of the discussion, the following description refers the SMT computing system 100 as providing N vector lanes and one scalar lane in parallel as shown in the example of FIG. 2. FIG. 2 further illustrates the execution path for an instruction I when it is not scalarized (shown in dotted lines) vs. scalarized (shown in solid lines). It is understood that a SMT computing system may provide any number of vector lanes and scalar lanes.

Referring again to FIG. 1, each processor 160 also includes a status register, hereinafter referred to as an EXEC register 170, which has N bits corresponding to N threads. The EXEC register 170 is used as an indicator to indicate which of the N threads are active. For example, if the i-th bit of the EXEC register 170 is set to a predetermined value, it indicates that the corresponding i-th thread is active. The EXEC register 170 may be set by a frontend unit of the processor 160; e.g., the instruction fetch and decode unit 120 or the thread scheduler 130. When a conditionally uniform instruction is executed by the scalar unit 152, the result of scalar execution is broadcast to the destinations of the active threads according to the bits set in the EXEC register 170.

In one embodiment, the instructions fetched by the instruction fetch and decode unit 120 includes a designated bit, hereinafter referred to as the u-bit, to indicate whether the instruction has been scalarized for execution by the scalar unit 152. If the u-bit is set (e.g., to a predetermined number such as one), the instruction and its source operands are issued to the scalar unit 152; otherwise the instruction and its source operands are issued to the vector units 150 for vector execution.

Figure 3:
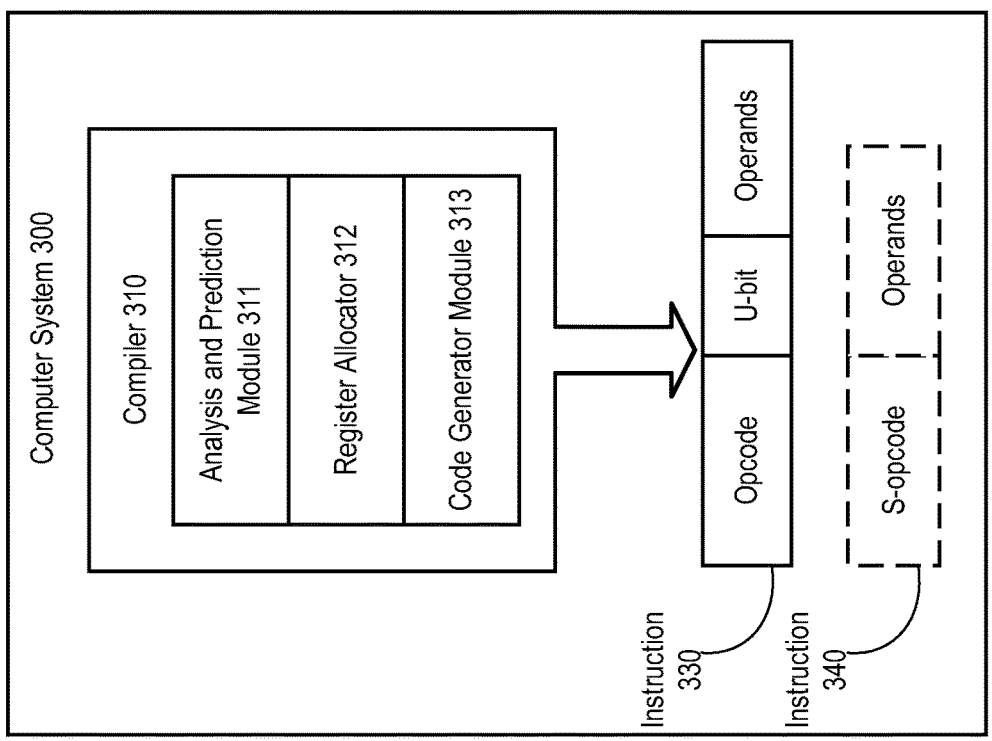
FIG. 3 illustrates a compiler that generates code for an SIMT computing system according to one embodiment.
Figure 9:
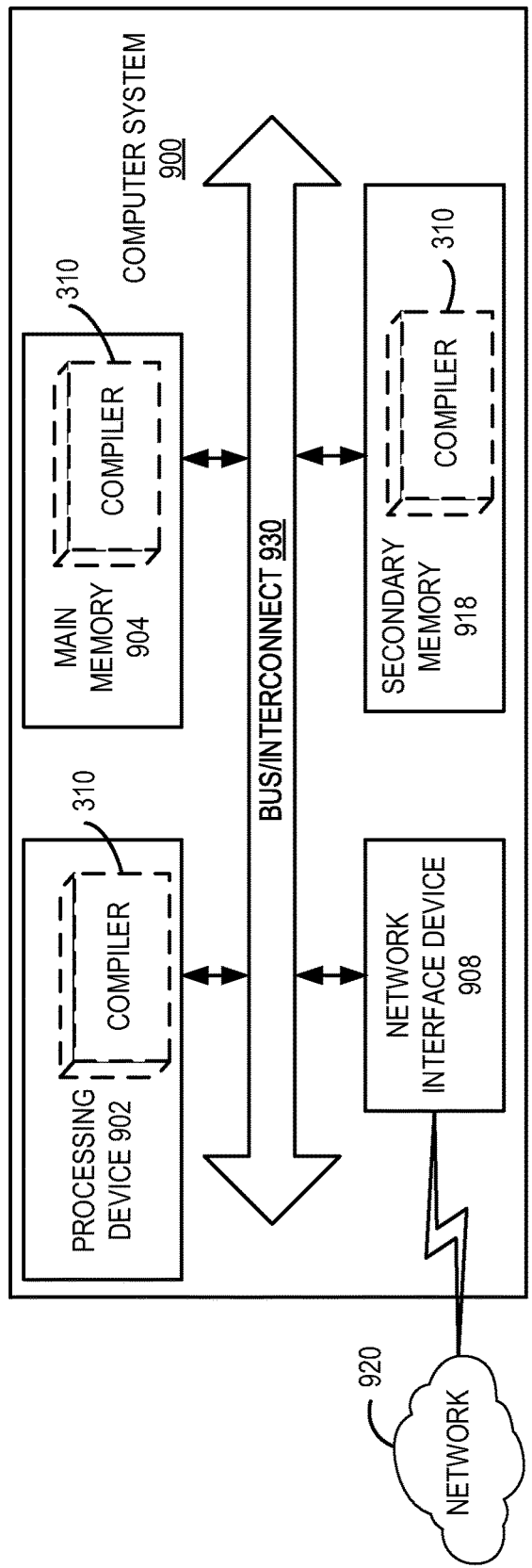
FIG. 9 is a block diagram illustrating a computer system according to one embodiment.

The setting of the u-bit is determined at compile time by a compiler, such as a compiler 310 of FIG. 3 according to one embodiment. The compiler 310 runs on a computer system 300, which may be different from the SIMT computing system 100 of FIG. 1. An example of the computer system 300 is shown in FIG. 9. The compiler 310 includes an analysis and prediction module 311 to perform analysis, e.g., static analysis, on an instruction sequence such as a computer program to predict whether an instruction is conditionally uniform or thread-varying (i.e., not conditionally uniform). An instruction is predicted to be conditionally uniform when the instruction is predicted to have the same source operands across all active threads and therefore the same result across all active threads. For a system having N vector lanes, the number of active threads M can be N≥M≥1. An instruction is uniform (a special case of conditional uniformity) when M=N.

The compiler 310 of FIG. 3 further includes a register allocator 312 and a code generator module 313. When the analysis and prediction module 311 finishes the analysis on the instruction sequence, the register allocator 312 allocates registers to source and result operands of each instruction, and the code generator module 313 generates executable machine code. For an instruction that is predicted to be conditionally uniform, the code generator module 313 sets the u-bit of the instruction (e.g., instruction 330) to a predetermined value to mark the instruction for scalar execution. In an alternative embodiment, the code generator module 313 may replace the instruction with a scalar instruction (e.g., instruction 340 as shown in the block with dash lines) that is designated for scalar execution.

Figure 4:
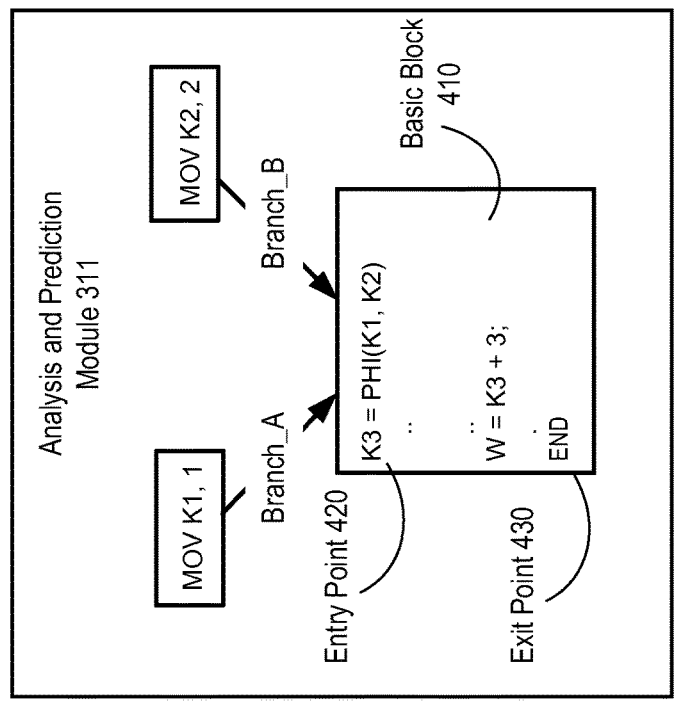
FIG. 4 illustrates an example of an analysis performed by a compiler according to one embodiment.

FIG. 4 illustrates an example of the operations performed by the analysis and prediction module 311 according to one embodiment. Initially, the analysis and prediction module 311 sets all instructions to be conditionally uniform. Then for each instruction, the module 311 determines whether one or more conditions exist that render the instruction thread-varying (i.e., not conditionally uniform). One condition is when an instruction's source operand receives its value from more than one source. In the example of FIG. 4, the module 311 identifies a basic block 410 that is the destination of two or more branches (e.g., Branch_A and Branch_B). A basic block is a code block that has only one entry point and one exit point. In the example, the basic block 410 has only one entry point 420 (where the statement K3=PHI(K1, K) is) and only one exit point 430 (where the END statement is). Within the identified basic block, the module 311 further identifies an instruction having a source operand that may receive its value from more than one branch; e.g. W=K3+3 receives the value of K3 from the PHI instruction, which depends on both Branch_A and Branch_B. While entering the basic block 410, the active threads are the union of active threads from Branch_A, e.g., M_a, and active threads from Branch_B, e.g., M_b. Upon identifying such an instruction within the basic block 410 and the condition: NOT "M_a must be M or M_b must be M" is satisfied, the module 311 marks the instruction as thread-varying (e.g., by removing its conditionally uniform setting). That is, in some scenarios the module 311 may be able to detect a "uniform branch" such as "M_a must be M or M_b must be M." If the module 311 determines that Branch_A or Branch_B is not a uniform branch and there is an instruction such as W=K3+3 in the basic block 410, then the instruction is marked as thread-varying. In other words, if Branch_A and Branch_B are both uniform branches, then the PHI instruction of all active threads (M) either take value from Branch_A (e.g., M_a==M and M_b==0) or Branch_B (e.g., M_b==M and M_a==0), but not from both (e.g., M_a>1 and M_b>1 and M_a+M_b==M) at runtime.

When an instruction is identified to be thread-varying, its result operand carries the thread-varying property and propagates to other instructions in the same or subsequent basic blocks that depend on or receive the value of the result operand. Those other instructions are also marked as thread-varying. It is understood that FIG. 4 is an example and other conditions or scenarios may exist for an instruction to be identified as conditionally uniform.

Figure 5:
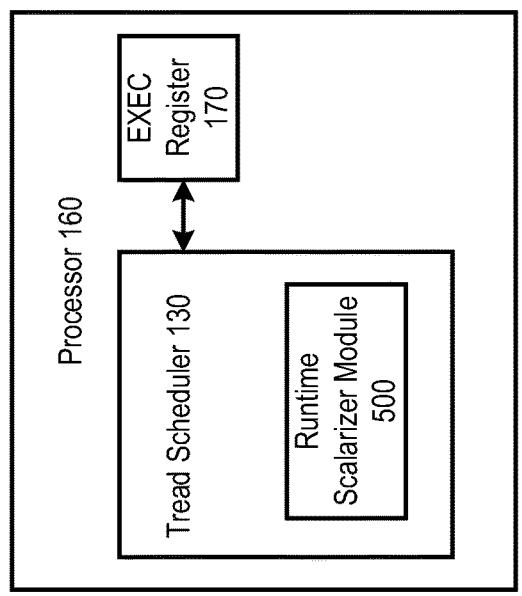
FIG. 5 illustrates a runtime scalarizer module according to one embodiment.

In some scenarios, the compiler 310 may be unable to determine whether an instruction is conditionally uniform if, for example, the complexity in making the determination exceeds a threshold, the determination is an undecidable or uncomputable problem, or the instruction receives or depends on unknown run-time inputs. However, the conditions that render the determination unfeasible may sometimes be resolved at runtime (also referred to as execution time). In one embodiment, the SIMT computing system 100 includes a runtime scalarizer module, which is part of the hardware circuitry that scalarizes an instruction after it is fetched but before it is executed. FIG. 5 illustrates a runtime scalarizer module 500 that is be part of the thread scheduler 130 (FIG. 1) according to one embodiment. It is understood that the runtime scalarizer module 500 may be located outside the thread scheduler 130 within the processor 160 in alternative embodiments.

In one embodiment, the runtime scalarizer module 500 identifies the number of active threads for instructions that have not been marked for scalar execution by the compiler 310. The number of active threads for an instruction may be indicated by a status register; e.g., the EXEC register 170 that has N bits, each bit corresponding to one of the N threads. An EXEC bit that is set to a predetermined number (e.g., one) indicates that the corresponding thread is an active thread.

If there is only one active thread for an instruction, the runtime scalarizer module 500 marks or directly dispatches that instruction for scalar execution. Scalarizing the computation of a single thread, in this case, removes the redundancy in the other (N−1) threads at no or negligible cost to the system. If there are multiple active threads, the runtime scalarizer module 500 compares the source operands across these active threads to determine whether their source operands are the same. If the source operands are the same across these active threads, the runtime scalarizer module 500 marks or directly dispatches the instruction for scalar execution. In one embodiment, a threshold may be set to limit the number of active threads compared by the runtime scalarizer module 500, because a large number of runtime comparisons may consume excessive power and computation cycles. The threshold may be a fixed threshold or configurable by a system administrator.

If an instruction is marked for scalar execution either by the compiler 310 or by the runtime scalarizer module 500, the instruction is dispatched to the scalar unit 152. After the scalar unit 152 performs the scalar operation, the result of the scalar operation is sent to the destination of the active threads as indicated by the corresponding EXEC bits.

Figure 6:
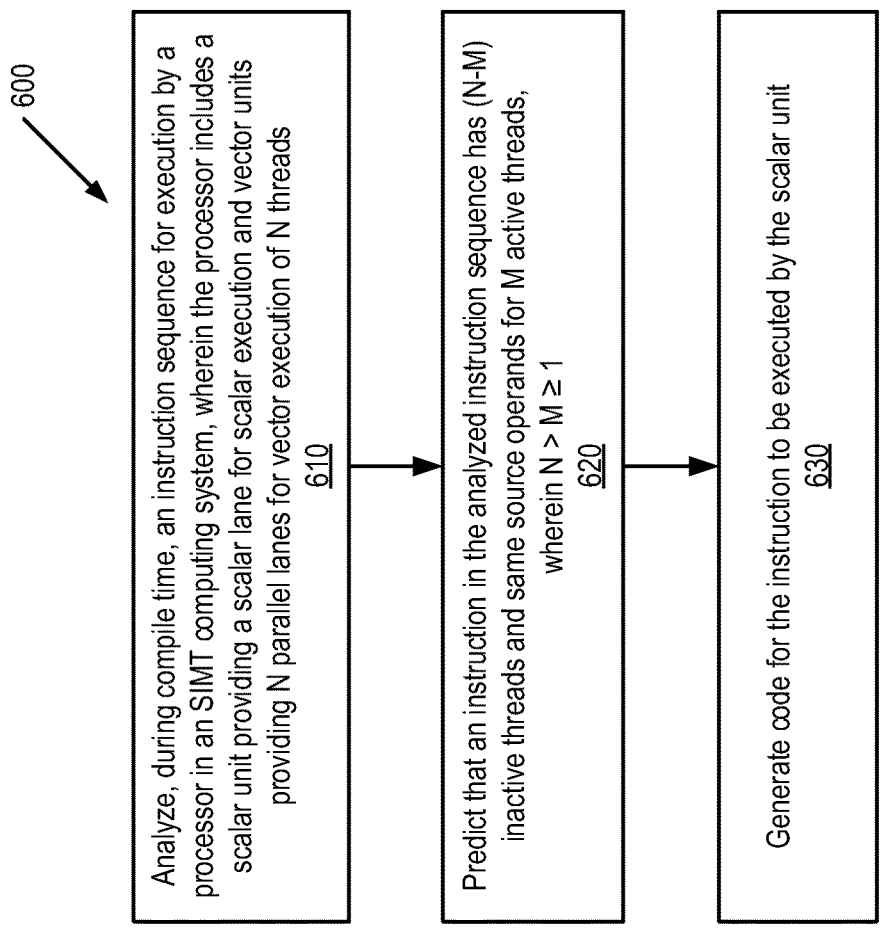
FIG. 6 is a flow diagram illustrating a method for compile time scalarization according to one embodiment.

FIG. 6 is a flow diagram illustrating a method 600 for processing an instruction sequence of multiple threads for execution in an SIMT computing system (e.g., the SIMT computing system 100 of FIG. 1) according to one embodiment. The method 600 may be performed by a compiler (e.g., the compiler 310 of FIG. 3) running on a computer. The method 600 begins when the compiler analyzes, during compile time, the instruction sequence for execution by a processor in the SIMT computing system (block 610). The processor includes a scalar unit providing a scalar lane for scalar execution and vector units providing N parallel lanes for vector execution of the multiple threads. The compiler predicts that an instruction in the analyzed instruction sequence has (N−M) inactive threads, and has the same source operands for M active threads, wherein N>M≥1 (block 620). After making the prediction, the compiler generates code for the instruction to be executed by the scalar unit (block 630).

In one embodiment, the compiler also predicts that a second instruction in the analyzed instruction sequence has the same source operands for all of the N threads. For both the instruction predicted in block 620 and the second instruction, the compiler may set a designated bit (e.g., the u-bit) in the generated code to indicate the scalar execution. Alternatively, the compiler may replace the predicted instructions with scalar instructions to indicate the scalar execution.

Figure 7:
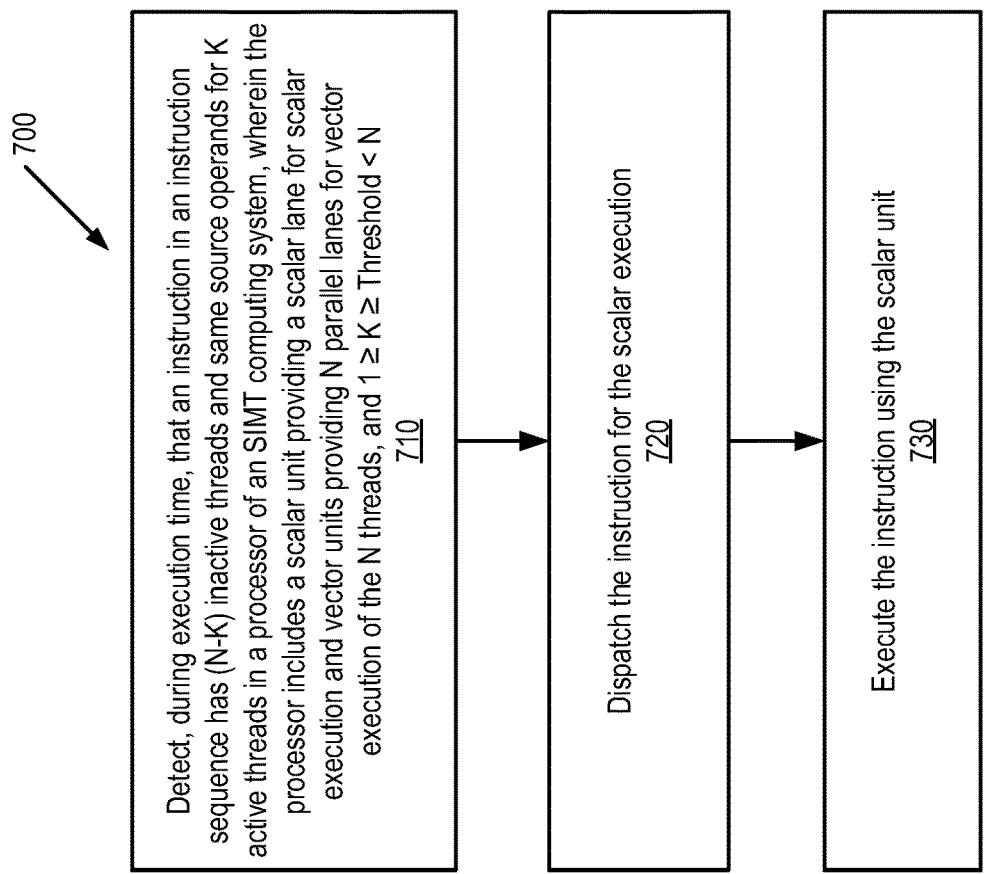
FIG. 7 is a flow diagram illustrating a method for execution time scalarization according to one embodiment.

FIG. 7 is a flow diagram illustrating a method 700 for processing an instruction sequence of multiple threads for execution in an SIMT computing system (e.g., the SIMT computing system 100 of FIG. 1) according to one embodiment. The method 700 may be performed by the SIMT computing system 100. The method 700 begins when the SIMT computing system (more specifically, the runtime scalarizer module 500 of FIG. 5) detects, during execution time, that an instruction in the instruction sequence has (N−K) inactive threads, and has the same source operands for K active threads in a processor of the SIMT computing system (block 710). The processor includes a scalar unit providing a scalar lane for scalar execution and vector units providing N parallel lanes for vector execution of the N threads, where 1≤K≤Threshold<N. Then the SIMT computing system dispatches the instruction for scalar execution (block 720), and executes the instruction using the scalar unit (block 730).

Figure 8:
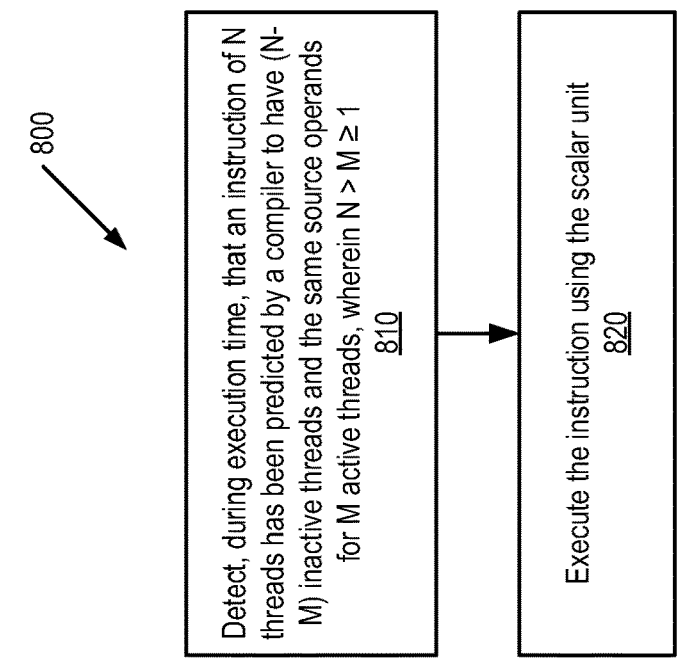
FIG. 8 is a flow diagram illustrating a method performed at execution time that detects compile time scalarization according to one embodiment.

FIG. 8 is a flow diagram illustrating a method 800 performed by an SIMT computing system (e.g., the SIMT computing system 100 of FIG. 1) according to one embodiment. The SIMT computing system includes a plurality of processors, and each processor further includes a scalar unit to provide a scalar lane for scalar execution and vector units to provide N parallel lanes for vector execution. The SIMT computing system also includes a scheduler to schedule multiple threads to each processor. Each processor is adapted to detect, during execution time, that an instruction has been predicted by a compiler to have (N−M) inactive threads and the same source operands for M active threads, wherein N>M≥1 (block 810). The processor is also adapted to execute the instruction using the scalar unit (block 820).

FIG. 9 illustrates a diagrammatic representation of a machine in the exemplary form of a computer system 900 within which a set of instructions, for causing the machine to perform any one or more of the methodologies discussed herein, may be executed. While only a single machine is illustrated, the term "machine" shall also be taken to include any collection of machines (e.g., computers) that individually or jointly execute a set (or multiple sets) of instructions to perform any one or more of the methodologies discussed herein.

The computer system 900 includes a processing device 902. The processing device 902 represents one or more general-purpose processors, and may also include one or more special-purpose processing devices. In one embodiment, the processing device 902 is adapted or operative to perform the method 600 of FIG. 6.

In one embodiment, the processing device 902 is coupled to one or more memory devices such as: a main memory 904 (e.g., read-only memory (ROM), flash memory, dynamic random access memory (DRAM), etc.), a secondary memory 918 (e.g., a magnetic data storage device, an optical magnetic data storage device, etc.), and other forms of computer-readable media, which communicate with each other via a bus or interconnect 930. The memory devices may also include different forms of read-only memories (ROMs), different forms of random access memories (RAMs), static random access memory (SRAM), or any type of media suitable for storing electronic instructions. In one embodiment, the memory devices may store the code and data of the compiler 310, which may be located in one or more of the locations shown as dotted boxes and labeled by the reference numeral 922. In alternative embodiments the compiler 310 may be located in other location(s) not shown in FIG. 9.

The computer system 900 may further include a network interface device 908. A part or all of the data and code of the compiler 310 may be transmitted or received over a network 920 via the network interface device 908.

In one embodiment, the computer system 900 store and transmit (internally and/or with other electronic devices over a network) code (composed of software instructions) and data using computer-readable media (also referred to as a machine-readable medium, a processor-readable medium, or a computer usable medium having a computer readable program code embodied therein), such as non-transitory tangible computer-readable media (e.g., magnetic, optical, or electrical storage medium including a diskette, compact disk read only memory (CD-ROM), digital versatile disc read only memory (DVD-ROM) memory device, flash memory, or similar volatile or non-volatile storage mechanism) and transitory computer-readable transmission media (e.g., electrical, optical, acoustical or other form of propagated signals—such as carrier waves, infrared signals). In one embodiment, a non-transitory computer-readable medium stores instructions of the compiler 310 for execution on one or more processors of the computer system 900.

The operations of the flow diagrams of FIGS. 6-8 have been described with reference to the exemplary embodiment of FIGS. 1-5 and 9. However, it should be understood that the operations of the flow diagrams of FIGS. 6-8 can be performed by embodiments of the invention other than those discussed with reference to FIGS. 6-8, and the embodiments discussed with reference to FIGS. 1-5 and 9 can perform operations different than those discussed with reference to the flow diagrams. While the flow diagrams of FIGS. 6-8 shows a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for processing an instruction sequence of multiple threads for execution in a Single-Instruction-Multiple-Treads (SIMT) computing system, the method comprising:
   analyzing, during compile time, the instruction sequence for execution by a processor in the SIMT computing system, wherein the processor includes a scalar unit for scalar execution and a plurality of vector units for vector execution of N threads in parallel;
   determining, during the compile time, that a vector processing instruction in the analyzed instruction sequence has (N−M) inactive threads and same source operands for M active threads, wherein N>M≥1; and
   generating, during the compile time and in response to the determining, code for the vector processing instruction to be executed by the scalar unit.

2. The method of claim 1, further comprising:
   setting a designated bit in the generated code for the vector processing instruction to indicate the scalar execution.

3. The method of claim 1, further comprising:
   determining that a second instruction in the analyzed instruction sequence has same source operands for the N threads; and
   setting a designated bit in the generated code for the second instruction to indicate the scalar execution.

4. The method of claim 1, further comprising:
   replacing the instruction with a scalar instruction to indicate the scalar execution.

5. The method of claim 1, wherein analyzing the instruction sequence further comprises:
   determining whether a basic block in which the instruction is located is a destination of more than one branch; and
   determining whether the instruction receives an operand from the more than one branch.

6. The method of claim 1, further comprising:
   detecting, during execution time, that the instruction has been predicted by the compiler for the scalar execution;
   dispatching the instruction to the scalar unit; and
   broadcasting a result of the scalar execution to destinations of the M active threads.

7. The method of claim 6, further comprising:
   dispatching another instruction to the vector units for execution concurrently with the instruction.

8. A method of executing an instruction sequence of N threads in a Single-Instruction-Multiple-Treads (SIMT) computing system, the method comprising:
   detecting, during execution time, that a vector processing instruction in the instruction sequence has (N−K) inactive threads and same source operands for K active threads in a processor of the SIMT computing system, wherein 1≤K≤Threshold<N, and wherein the processor includes a scalar unit for scalar execution and a plurality of vector units for vector execution of the N threads in parallel;
   dispatching the vector processing instruction for the scalar execution in response to the detecting; and
   executing the vector processing instruction using the scalar unit.

9. The method of claim 8, wherein detecting the instruction further comprises:
   detecting that a designated status register has K bits set as an indication that corresponding K threads are active.

10. The method of claim 9, further comprising:
    sending a result of the scalar execution to destinations of the K active threads.

11. The method of claim 8, further comprising:
    detecting that a designated bit of the vector processing instruction has been set to indicate a compile time predication that the vector processing instruction has the same source operands for the K active threads; and
    executing the vector processing instruction by the scalar unit in response to detection of the designated bit being set.

12. The method of claim 8, further comprising:
    dispatching another instruction to the vector units for execution concurrently with the instruction.

13. A Single-Instruction-Multiple-Treads (SIMT) computing system comprising:
    a plurality of processors, each of the processors including a scalar unit for scalar execution and a plurality of vector units for vector execution of multiple threads in parallel; and
    a scheduler to schedule the multiple threads to each of the processors,
    wherein each of the processors is adapted to:
      detect, during execution time from code generated by a compiler, that a vector processing instruction of N threads has been determined by a compiler to have (N−M) inactive threads and same source operands for M active threads, wherein N>M≥1; and
      execute, in response to determination by the compiler, the vector processing instruction using the scalar unit.

14. The computing system of claim 13, wherein each of the processors is further adapted to:
    detect that a designated bit of the vector processing instruction has been set as an indication of the scalar execution.

15. The computing system of claim 13, wherein each of the processors further comprises a status register having N bits that correspond to the N threads, and wherein M of the N bit are set as an indication that corresponding M threads are active.

16. The computing system of claim 13, wherein each of the processors is further adapted to:
    detect, during the execution time, that a second instruction which has not been predicted for the scalar execution has one active thread and (N−1) inactive threads; and
    execute the second instruction by the scalar unit.

17. The computing system of claim 13, wherein each of the processors is further adapted to:
    detect, during the execution time, that a second instruction which has not been predicted for the scalar execution has (N−K) inactive threads and same source operands for K active threads, wherein 1≤K≤Threshold≤N; and
    execute the second instruction by the scalar unit.

18. The computing system of claim 17, wherein each of the processors is further adapted to:
    broadcast a result of the scalar execution to destinations of the K active threads.

19. The computing system of claim 13, wherein each of the processors is further adapted to:
    broadcast a result of the scalar execution to destinations of the M active threads.

20. The computing system of claim 13, wherein each of the processors is further adapted to:

dispatch another instruction to the vector units for execution concurrently with the instruction.

\* \* \* \* \*